F. JOHNSON.
Plow.
No. 206,880. Patented Aug. 13, 1878.
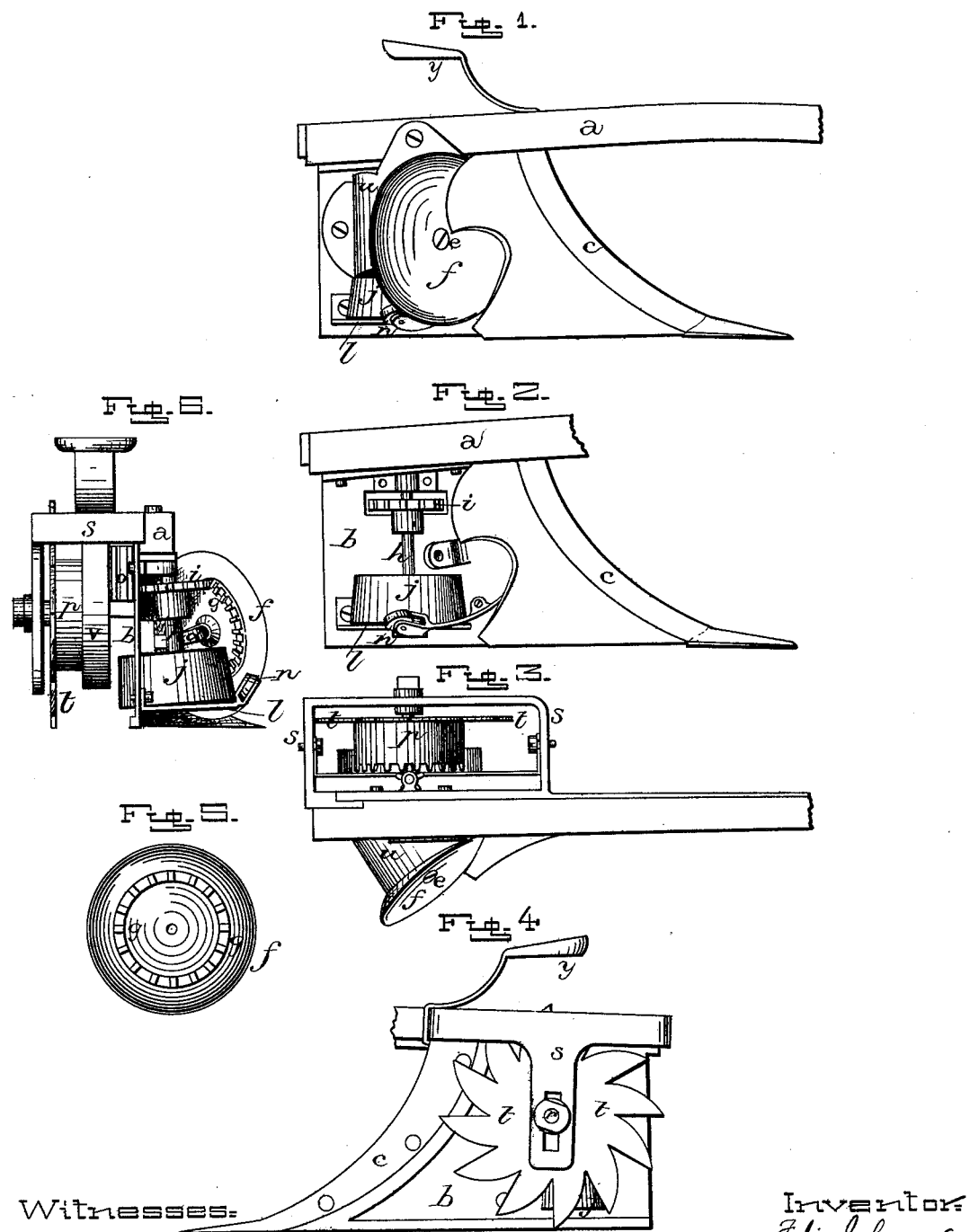

UNITED STATES PATENT OFFICE.

FELIX JOHNSON, OF PARIS, TEXAS.

IMPROVEMENT IN PLOWS.

Specification forming part of Letters Patent No. 206,880, dated August 13, 1878; application filed July 6, 1878.

*To all whom it may concern:*

Be it known that I, FELIX JOHNSON, of Paris, in the county of Lamar and State of Texas, have invented certain new and useful Improvements in Plows; and I do hereby declare the following to be a full, clear, and exact description of the invention, such as will enable others skilled in the art to which it pertains to make and use it, reference being had to the accompanying drawings, which form part of this specification.

My invention relates to an improvement in plows; and it consists in the combination of a revolving concave disk on the mold-board side and a revolving cutter-wheel on the land-side and an intermediate operating mechanism, as will be more fully described hereinafter.

The accompanying drawings represent my invention.

$a$ represents the beam, to one side of which is secured the land-side $b$. This land-side is made from a single wide plate, which is recessed or grooved at its front edge, to receive the colter $c$. The mold-board is quite narrow, and has its rear edge recessed out, as shown.

Projecting outward from the center of the land-side is the bearing $d$, from which extends the pivot $e$, upon which the revolving concave disk revolves. This disk $f$ has its front edge hidden behind the rear edge of the mold-board, and projects backward at any suitable angle, so as to receive the sod and dirt from the mold-board and turn it over. Upon the rear side of this disk are formed the circle of cogs $g$, which mesh with the pinion $i$ on the shaft $h$.

The shaft $h$ has its ends held in suitable bearings, and has secured to it the large roller $j$, which has one edge to project through an opening in the land-side, so as to bear against the vertical side of the furrow, and not only counteract the pressure of the mold-board, but cause the shaft to constantly revolve. The same bearing, $l$, in which the lower end of the shaft $h$ is stepped extends outward and forward, so as to form a covering for the whole space between the revolving disk and the land-side, not only to form a bearing for the roller $n$, but to prevent dirt and obstructions of any kind from rising up into the operating mechanism.

The roller $n$ bears against the outer edge of the disk, as shown, and braces it in position.

The pinion $i$ also meshes with the long pinion $o$, which is journaled in suitable bearings on the outer side of the land-side, and which, in turn, receives motion from the cylinder $p$, which has teeth or cogs formed in its inner edge. The pivot or bolt $r$, upon which this cylinder revolves, passes through a slot in the hanging portion of the frame $s$, which is secured to, and projects some distance out beyond, the land-side of the beam $a$, and can be adjusted up and down in the slot, so as to raise or depress the cutter-wheel $t$, which is secured to the outer end of the cylinder.

As the pinion $o$ is of considerable length, the cylinder and its cutter-wheel $t$ can be adjusted up and down sufficiently far to make the plow run deep or shallow, as may be desired.

Around the sides and lower edge of the cylinder is placed the shield $v$, and over the top of those parts just in rear of the disk $f$ is placed another shield, $u$, to keep the working parts from being clogged with dirt.

The disk $f$ is here shown as having a mechanism to keep it revolving while the plow is in use, and this is necessary in those sticky soils where the earth adheres to the mold-board in such a manner as to clog the plow, but not in free soil. Upon the frame $s$ is secured the seat $y$.

Having thus described my invention, I claim—

1. The combination, in a plow, of a revolving mold-board, $f$, provided with cogs $g$, the vertical shaft $h$, having pinion $i$, the gear-wheel $o$, toothed cylinder $p$, and cutter-wheel $t$, substantially as described.

2. The combination of the roller $j$, vertical shaft $h$, having pinion $i$, and the revolving mold-board $f$, having the teeth $g$ upon its inner side, substantially as set forth.

3. The combination of vertically-adjustable cutter $t$, toothed cylinder $p$, long pinion $o$, shaft $r$, and frame $s$, substantially as shown.

In testimony that I claim the foregoing I have hereunto set my hand this 12th day of June, 1878.

FELIX JOHNSON.

Witnesses:
W. H. NORTHCUTT,
E. D. SCALES.